Feb. 4, 1941. G. E. TEGERDINE 2,230,769
CLAMPING DEVICE
Filed June 4, 1940
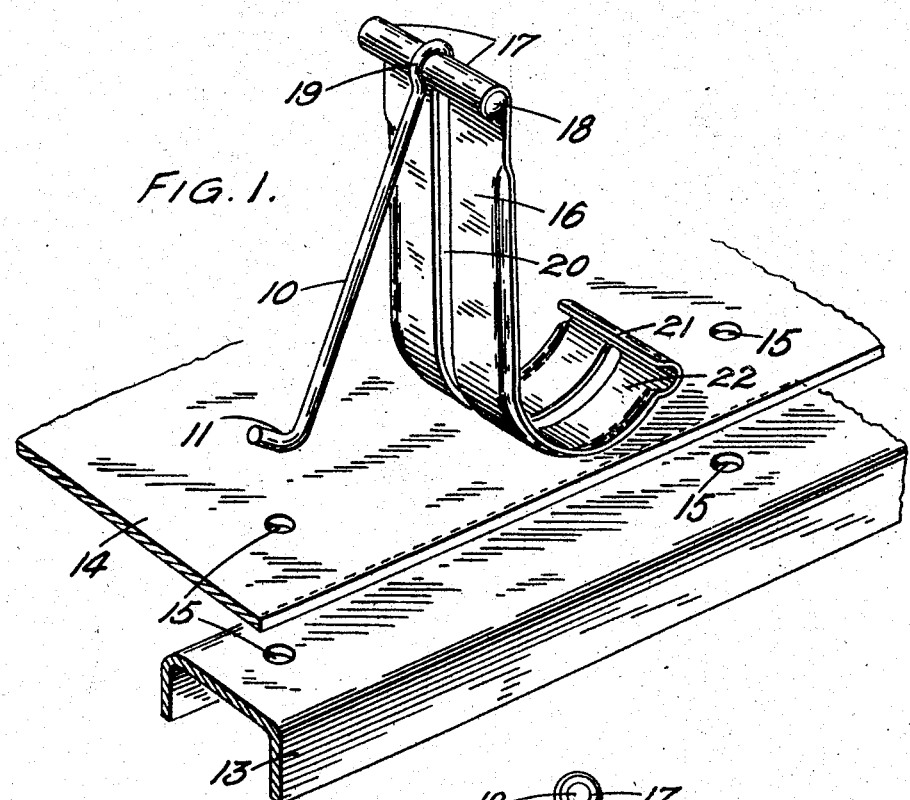
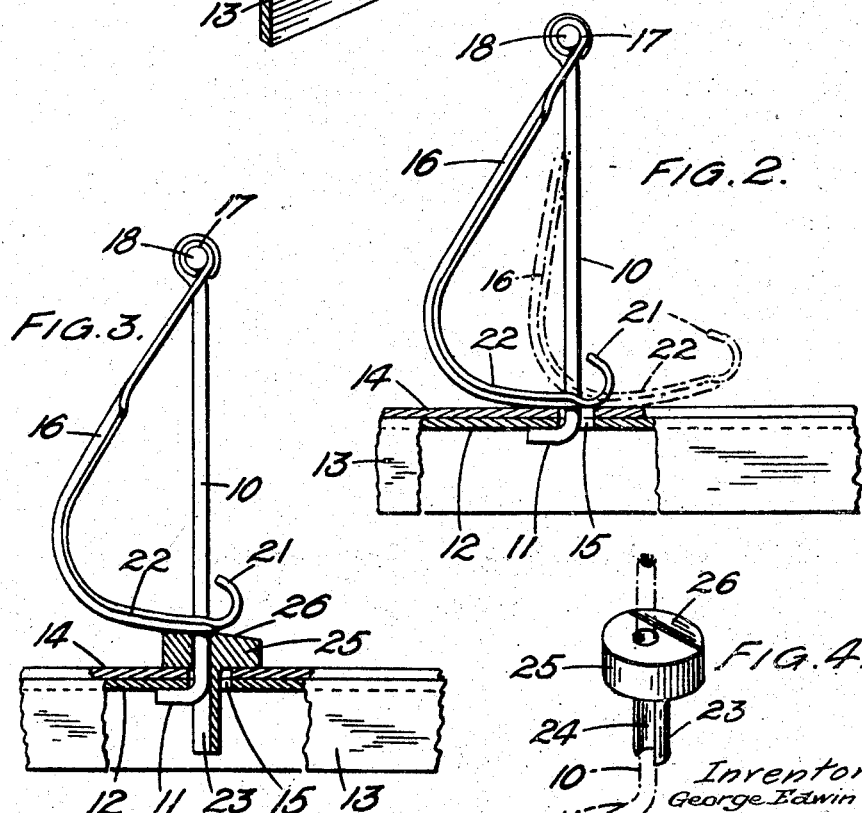

Patented Feb. 4, 1941

2,230,769

UNITED STATES PATENT OFFICE 2,230,769

CLAMPING DEVICE

George Edwin Tegerdine, Feltham, England, assignor to General Aircraft Limited, Feltham, England Application June 4, 1940, Serial No. 338,795
In Great Britain October 19, 1938

10 Claims. (Cl. 85—5)

This invention relates to clamping devices, and a particular application is to such devices for holding together a plurality of parts such as metal plates or structural members to facilitate their assembly by riveting, bolting, or like operations.

The invention has a particular use in the manufacture of aircraft where metal plates are attached to a supporting structure or interattached by solid or tubular rivets. In the manufacture of stressed skin metal aircraft it often arises that the parts to be riveted are readily accessible from one face only, and in such cases tubular rivets are often used, being expanded by tools operated from the accessible face. It is desirable when assembling riveted structures that temporary clamps, which accurately align at least certain of the holes through which rivets are to be engaged (and thereby at least a large proportion of the series of rivet holes) are positioned so as to facilitate the riveting operation.

It is an object of the invention to provide clamping devices for holding together a plurality of parts such as metal plates or structural members to facilitate their assembly by riveting.

It is a further object of the invention to provide a clamping device which may be readily positioned, for example from the outside or from the working face of a structure from which riveting is effected.

Yet a further object of the invention is to provide such a clamping device which is simple in construction and readily positioned for use.

According to the present invention, a clamp to locate holes of structural parts to be united by an operation such as riveting includes a member supporting an abutment for engagement with one free face of the parts to be assembled, and a second abutment carried by said member and movable in relation thereto, to engage the opposite free face of said parts whereby to exert a clamping force thereon. Preferably, the member is adapted to extend through riveting holes formed in the parts to be assembled, as for example by including a part of rod or wire form, and an abutment may conveniently be formed of such a rod or wire by turning over an extremity. The turned-over portion constitutes a foot which can be threaded through the rivet holes. The actual contact of an abutment with the surface may in certain cases be through a washer or like auxiliary abutment surface, for example slidably supported on a rod or wire member of the clamping device.

Preferably, the means urging abutments together is pivotally mounted upon a rod or wire member whereby it is readily swung in and out of clamping position, whilst in cases where the rivet hole is somewhat larger in diameter than that of a rod or wire member, the latter may support a sleeve of external diameter corresponding to the diameter of the rivet hole, so as to locate the abutment on the rod in engagement with the appropriate face of the work.

In cases where the rod or wire of the rivet clamps engage through the rivet holes, the procedure when assembling the structure for riveting is generally such that the clamps are engaged through certain or all of the holes through which the rivets are to be secured. The clamps are then removed in turn, or in a certain predetermined order, the rivets being applied as each clamp is removed. Instead of placing the rivet clamps through the pairs or series of holes actually to be riveted, the structure may include certain master holes for the reception of clamps which can be left in position during the riveting, bolting or like operation ready to be removed on completion.

In the accompanying drawing forming a part of this specification and in which like numerals are employed to designate like parts throughout the same:

Figure 1 shows in perspective a clamping device incorporating an L-shaped spring providing the second abutment; the figure also indicates parts to be assembled by riveting;

Figure 2 shows in part section the parts clamped together by the device shown in Figure 1;

Figure 3 shows a modification of the clamping device shown in Figures 1 and 2, illustrating a sleeve carried on the rod or wire member; and Figure 4 is a detail view illustrating the sleeve with an abutment constituted by a flange thereof.

In each of the Figures 1, 2 and 3, the clamping device shown comprises a stiff wire or rod 10 having a substantially straight portion and a turned-over foot 11 at its lower extremity which constitutes a first abutment adapted to contact or press against the free face 12 on the underside of one of the parts 13 (indicated as a channel structural member) to which a metal plate 14 is to be attached by riveting. To that end, the rod member 10 extends through rivet holes 15. The second abutment is constituted by an L-shaped spring 16 of leaf form, the angle of the bend between the limbs of which is somewhat less than 90°. The leaf spring is rolled over at its upper extremity 17 to embrace a pivot pin 18 disposed transverse to the longitudinal axis of the rod 10, which is bent over at its upper end 19 around the pivot pin 18 so as to be angularly movable relative to the spring. The spring is slit lengthwise down the centre of it to a point adjacent its outer extremity 21. The width of the slit 20 is approximately equal to the diameter of the wire 10 so that the wire can pass therethrough in swinging about the pivot pin 18. The limb 22 of the spring 16 forms the second abutment, and the length of wire between the pivot 18 and foot 11 is somewhat less than the corresponding length between the pin 18 and the limb 22 when the spring is uncompressed, so that when the limb 22 is swung in with its extremity 21 in opposed relationship to the abutment 11, as shown in Figure 2, a resilient clamping force is exerted, urging the parts 13 and 14 together.

In using the clamp above described, and in particular that illustrated in Figures 1 and 2, the wire is pivoted to a position such as shown in Figure 1, and the foot is then threaded through the riveting holes, whereafter the wire is held substantially normally to the surface to be riveted. The spring is then moved angularly about the pivot provided by the pin 18 so that the abutment surfaces constituted by the limbs 22 slide over the plate 14 or equivalent part to be riveted and deform the spring, whereby a resilient clamping force is exerted between the two abutments, holding the parts firmly together.

In the modification shown in Figures 3 and 4, the rod 10 carries a sleeve 23 of diameter approximating to that of the rivet holes 15. This sleeve is slit longitudinally at 24 to allow the passage of the foot 11, and it supports at its end nearer the pivot pins 18 a radial flange 25, which constitutes in effect an auxiliary abutment through which the actual force of the abutment 22 is transmitted to the upper free surface of the parts to be riveted. The purpose of the sleeve 23 is more accurately to locate the rod 10 within the holes 15 and thereby maintain the foot 11 in engagement with the undersurface 12 of the parts to be riveted. In using the device, the sleeve is slid up the rod towards the pivot 18 to allow the foot 11 to be readily threaded through the holes 15; the sleeve is then allowed to slide into the holes and is rotated so that the foot 11 engages the slit 24, whereafter the spring 16 can be moved angularly to the position shown in Figure 3 where it is deformed. The abutment provided by the flange 25 may be ramped, as shown at 26, to facilitate the angular movement of the spring 16 about the pivot 18.

In certain cases it may be found desirable to use an auxiliary abutment in the form of a collar slidable on the rod 10 in the manner of the part 25, but not necessarily carrying a sleeve such as 23. Such an arrangement may enable pressure to be applied to the surface in a uniformly distributed manner, whilst damage to the surface by the sliding movement of the spring may be prevented. In the arrangement shown in Figure 3, the foot 22 is spaced from the surface 14, and such spacing may be particularly convenient when using the device in the immediate vicinity of turned-up edges or flanges on parts to be riveted; the foot 22 in this case being spaced above the surface of the plate 14 to an extent sufficient to clear any up-turned edges.

It will be appreciated that the device described above provides a clamp which may be readily applied for the purpose of accurately locating plates or other parts to be riveted relatively to one another. The form of spring described may be arranged to be of a particularly strong clamping force, whilst at the same time no excessive effort is required to position and compress the spring. The device as a whole is simple and cheap in construction.

What I claim is:

1. A clamp to locate holes of structural parts, including a rod, an abutment fixed on said rod for engagement with one free face of the parts, and a movable abutment comprising a bowed spring pivotally mounted on said rod, said bowed spring being formed of sheet material and so mounted on said pivot that its surface is curved around the lines parallel to the axis of said pivot as centers, said bowed spring being swingable into a position in which it is engaged under compression between its pivot and the free face of said parts remote from said first-mentioned free face whereby to cooperate with said fixed abutment to effect clamping of said parts.

2. A clamp to locate holes of structural parts, including a rod having an abutment at one end, and, swingable about a point towards the opposite end of said rod, a bowed spring having an overall natural length somewhat greater than the distance between said abutment and the point about which said spring is swingable; said bowed spring being formed of sheet material and so mounted on said pivot that its surface is curved around the lines parallel to the axis of said pivot as centers, whereby said spring is swingable into a position in which it is held under compression to urge the parts towards said abutment, and thereby effect clamping of the parts.

3. A clamp to locate holes of structural parts, including a rod having an abutment at one end, and, swingable about a point near the other end of said rod, a bowed spring having an overall natural length somewhat greater than the distance between said abutment and the point about which the said spring is swingable, and a separate abutment; said bowed spring being formed of sheet material and so mounted on said pivot that its surface is curved around the lines parallel to the axis of said pivot as centers, said spring being swingable into a position in which it is under compression, to clamp between it and said first abutment said parts with said separate abutment interposed between an exposed surface of said parts and a part of said clamp, to prevent scoring of said exposed surface by said clamp part.

4. A clamp as set forth in claim 2, wherein the spring is substantially L-shaped, the foot portion thereof affording a surface for engagement with the free face remote from that engaged by said fixed abutment.

5. A clamp as set forth in claim 2, wherein said bowed spring is of leaf form, being split throughout the greater part of its length to accommodate the rod in swinging of the spring in relation thereto.

6. The combination of clamp and separate abutment as set forth in claim 3, in which said separate abutment includes a part to enter the holes of the structural parts and an enlarged head surface for interposition between a structural part surface and a cooperating abutment.

7. A clamp as set forth in claim 1, in which said member is constituted by a rod of sufficiently small diameter for insertion through said holes.

8. A clamp to locate holes of structural parts, comprising a member, at least one abutment on said member for engagement with one free face of the parts, a pivot on said member spaced from said abutment and a movable abutment comprising a strip of resilient material having one end mounted on said pivot, said pivot having its axis parallel to the surface of the strip and transverse to the length of the strip, and said strip being bowed, said strip being swingable into a position in which it is engaged between its pivot and the free face of said parts opposite said first free face.

9. In a device as claimed in claim 8 in which said member comprises a rod and said strip extends in the direction of its pivot on both sides of the rod, said strip having therein a longitudinal slot opposite said rod.

10. In a device as claimed in claim 8 in which said member comprises a rod and said strip extends in the direction of its pivot on both sides of the rod, said strip having therein a longitudinal slot opposite said rod, said slot terminating short of the free end of said strip.

GEORGE EDWIN TEGERDINE.